Nov. 2, 1965　　　　　　H. F. DAVIS　　　　　3,214,964
FLUID ANALYZING INSTRUMENTATION SYSTEM
Filed June 1, 1962　　　　　　　　　　　　　　4 Sheets-Sheet 1
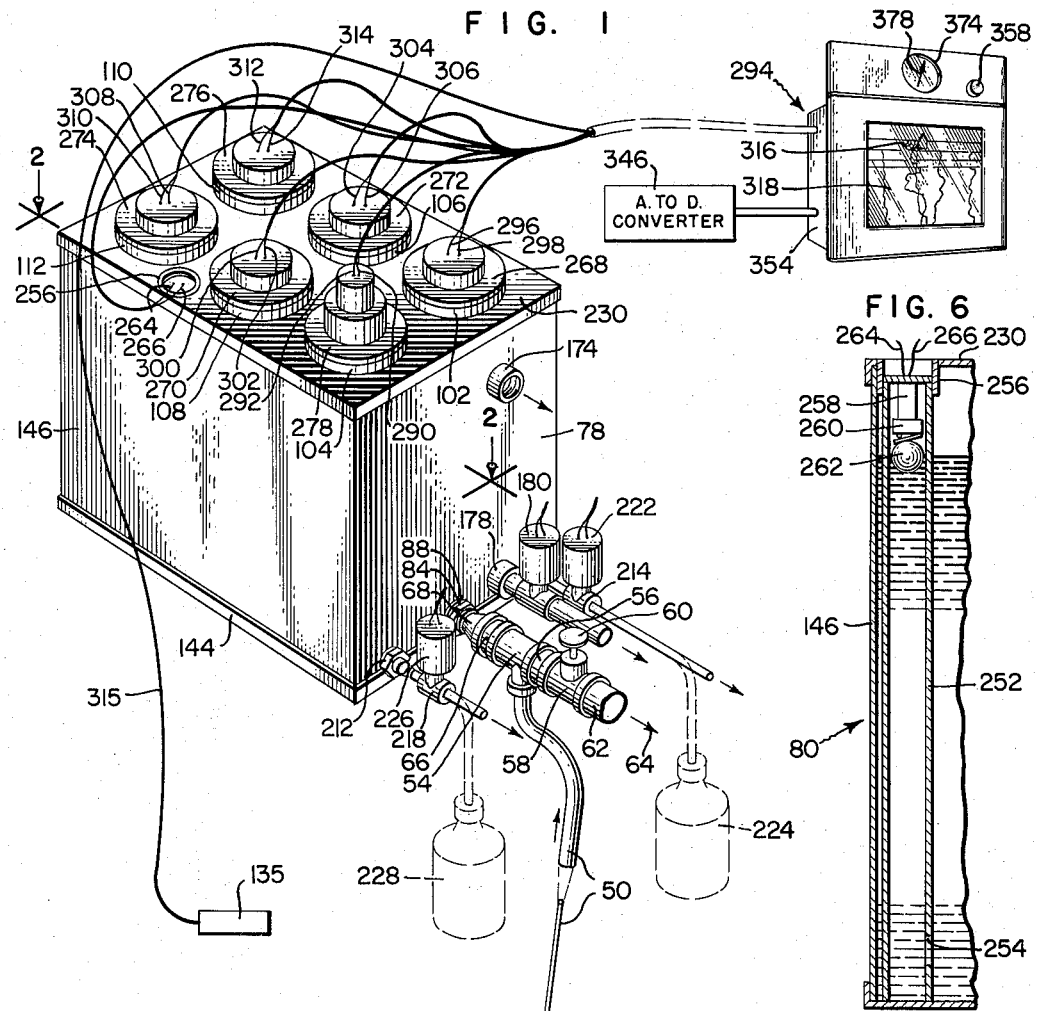
INVENTOR.
HENRY F. DAVIS
BY Arthur H. Swanson
ATTORNEY.

Nov. 2, 1965
H. F. DAVIS
3,214,964
FLUID ANALYZING INSTRUMENTATION SYSTEM
Filed June 1, 1962
4 Sheets-Sheet 2
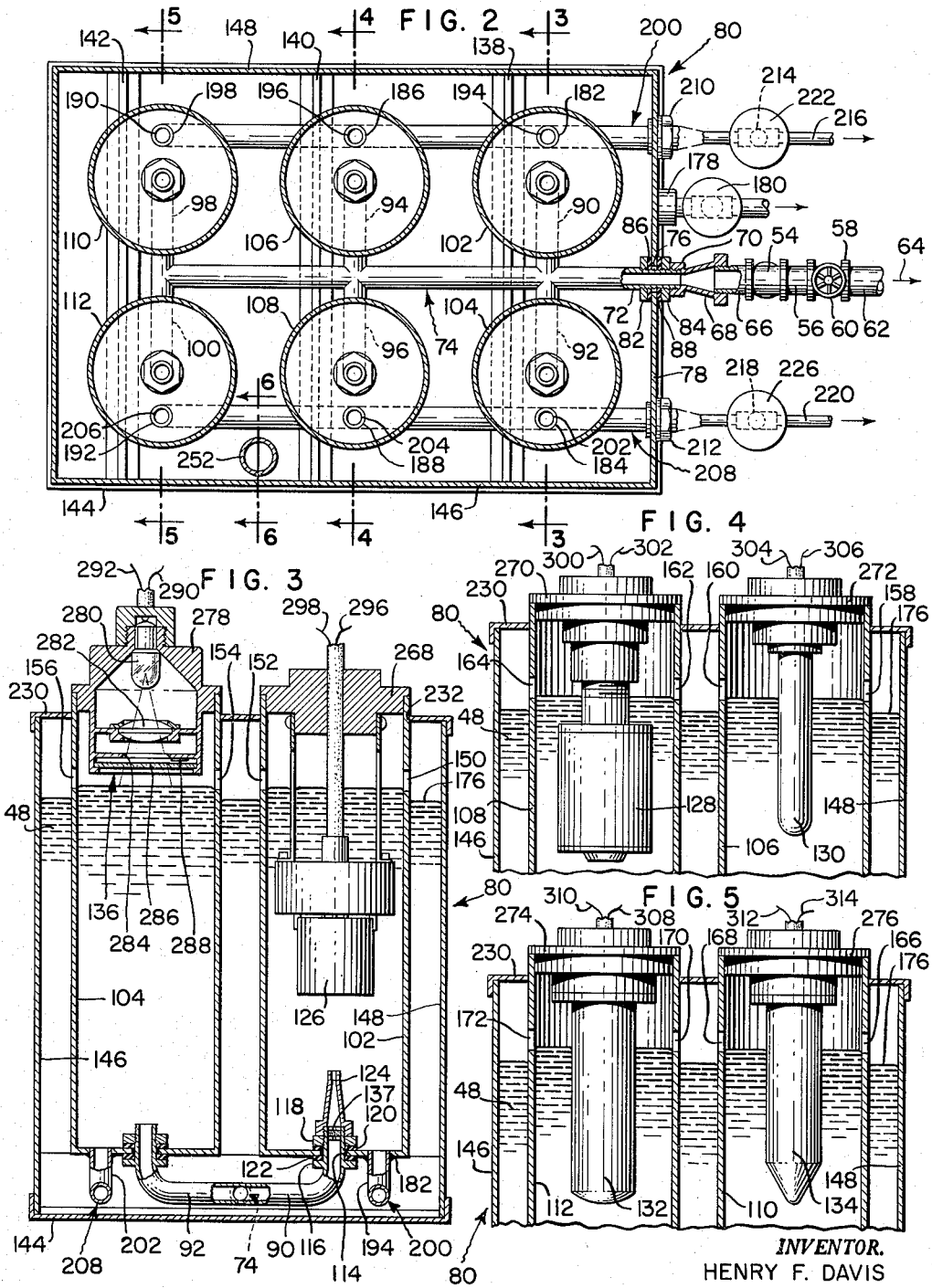
INVENTOR.
HENRY F. DAVIS
BY Arthur H. Swanson
ATTORNEY.

Nov. 2, 1965   H. F. DAVIS   3,214,964
FLUID ANALYZING INSTRUMENTATION SYSTEM
Filed June 1, 1962   4 Sheets-Sheet 3
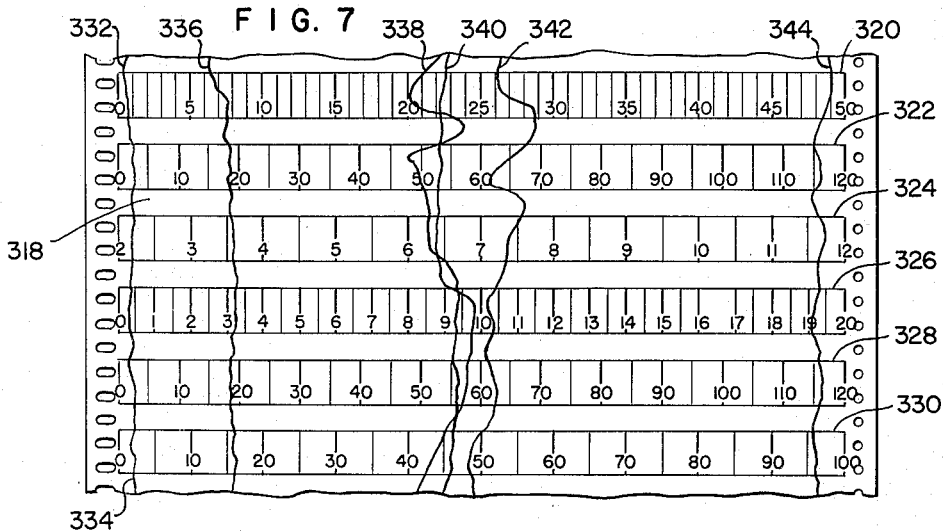
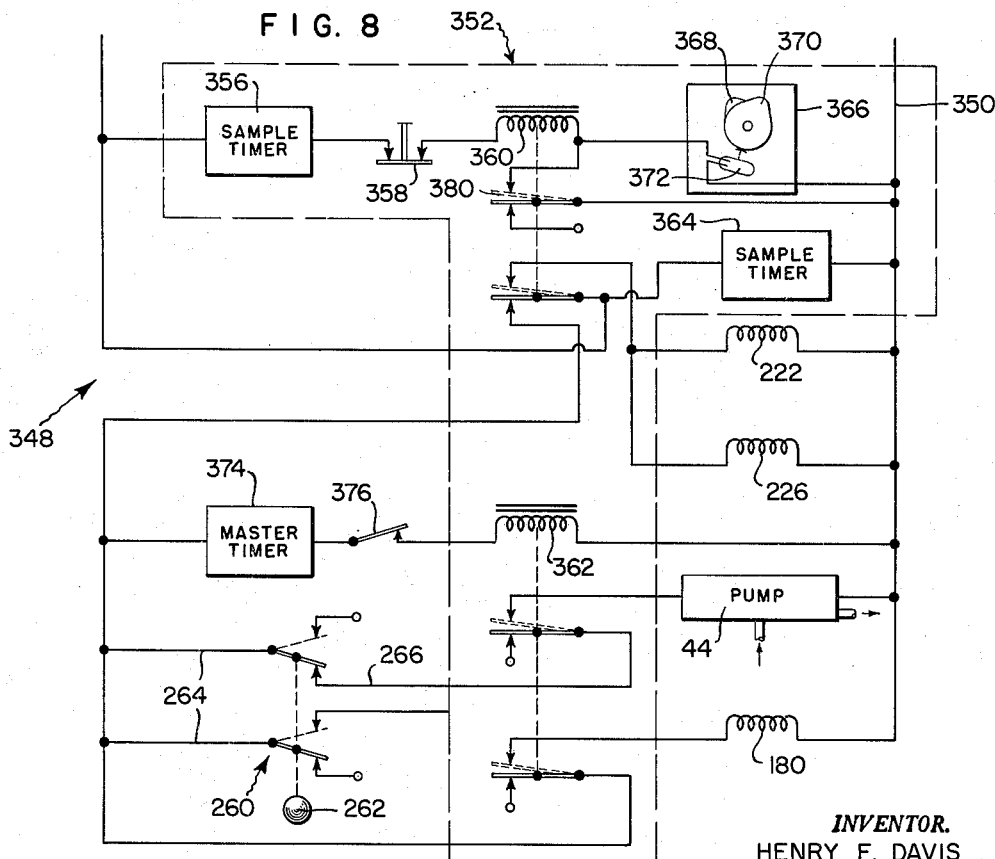
INVENTOR.
HENRY F. DAVIS
BY Arthur H. Swanson
ATTORNEY.

Nov. 2, 1965 H. F. DAVIS 3,214,964
FLUID ANALYZING INSTRUMENTATION SYSTEM
Filed June 1, 1962 4 Sheets-Sheet 4

*INVENTOR.*
HENRY F. DAVIS
BY
*Arthur H. Swanson*
ATTORNEY.

United States Patent Office 3,214,964
Patented Nov. 2, 1965

3,214,964
FLUID ANALYZING INSTRUMENTATION
SYSTEM
Henry F. Davis, Worcester, Pa., assignor to Honeywell
Inc., a corporation of Delaware
Filed June 1, 1962, Ser. No. 199,314
15 Claims. (Cl. 73—53)

It is an object of the present invention to disclose an apparatus for automatically making continuous or intermittent quantitative and qualitative measurements of a fluid mixture in order to determine if the fluid under measurement meets certain prescribed standards.

It is another more specific object of the present invention to disclose a fluid analyzing apparatus of the aforementioned type which is particularly useful in determining if raw water being drawn from a stream is in a suitable unpolluted condition for use by a water filtration plant.

It is another object of the present invention to disclose a portable raw water analyzing apparatus that can advantageously be used continuously and/or intermittently to measure various characteristics of raw water which is located at any one or more preselected depths and locations in a river, lake, stream, ocean or any other confined or unconfined body of water.

Prior to the present invention, it has been the practice to transmit an individual sample of water to be tested by way of a first individual conduit to a first water sampling tank located in one location of a laboratory where a first measurement of the characteristic of the water is made under a first ambient temperature laboratory condition and to transmit other different individual samples of this water to be tested by way of other individual conduits to other associated water sampling tanks that are located in other different remote locations in the laboratory where other different ambient temperature conditions exist.

With this widely separated sampling tank arrangement it has been impossible to obtain any true correlation between the measurements being made of a water sample in one of the tanks and the measurement being made of other different samples of this water that are present in any one of the other tanks.

More specifically, it is an object of the present invention to disclose an adjustable float structure from which a pump can be immersed to selected levels beneath the surface of a stream, thereby enabling samples at these selected levels in the stream of raw water to be transmitted by means of the pump and a single conduit connected thereto to each of a plurality of water sampling tanks positioned within a container.

In order to determine the time it takes for a stream to rid itself of a polluted condition which is brought about by an animal, fish or vegetable life-killing chemical that has been dumped into a stream, it has become more readily important for our public health bacteriologists to have a better, more accurate way of measuring certain selected characteristics possessed by a sample of raw water which is drawn from the stream without introducing different ambient temperature errors and other errors due to poor sampling techniques into each of these measurements.

To accomplish this goal the present invention employs a plurality of water sampling tanks within a single overflow ambient temperature compensating container which container is constructed to receive a volume of water from the tanks that is preferably three times the volume of the tanks so that at least three tankfuls of raw water from a selected location in the stream under analysis will be allowed to simultaneously flow into the bottom portion of each tank and thence out into the ambient temperature compensating container before a container liquid level interlock circuit allows measurements of certain characteristics of the water in the tanks to be taken.

It is another object of the present invention to disclose not only an apparatus that is capable of making a continuous river water analysis, but also an intermittent-timed sampling water analysis with which the user can always be assured that he has a good reliable representative sample of water in each of his tanks, because the water in each of these tanks is changed at least three times before measurements of its condition are allowed to be made.

It is another object of the present invention to employ a T-shaped conduit which has an adjustable flow restrictor element in one branch thereof so that a portion of the raw water being transmitted from a pump in a stream through this T-shaped conduit to the sampling tanks can be simultaneously returned to the stream, thereby, providing a way of regulating the time it takes to fill the tanks and the quantity of the sample flowing thereto during any selected period of time.

It is thus another object of the present invention to provide the heretofore-mentioned water filled container in spaced relation with a plurality of water sampling tanks so that the ambient temperature of the water in each and every one of the tanks will be maintained at a constant value while different but vitally inter-related characteristic measurements of the water are being sensed by probes which are associated with each of the tanks.

It is another object of the present invention to employ a single chart for a multi-point recorder which has a plurality of different characterized, spaced-apart scales printed thereon so that an extremely accurate continuous reading of the raw water measurements can be sensed by the aforementioned probes and a multicolored chart record made of these measurements in order to provide a rapid evaluation of the health of a stream from which the sample raw water was drawn.

More specifically, it is another object to disclose an apparatus of the aforementioned type that can continuously sense and sequentially record on a single chart the temperature, turbidity, pH, chloride ion content, conductivity, dissolved oxygen content and sunlight intensity of a continuously flowing sample of raw water.

It is another object of the invention to provide a pump and drain control circuit which will, on demand, allow nozzles connected to a raw water inlet port of each tank to spray-clean their associated water quality sensing probes.

It is still another object of the present invention to employ a plurality of switching circuits for the aforementioned multi-point recording apparatus at unmanned stations which switching circuits are operably connected so that they will automatically cause a solenoid-operated valve to open and a specimen of the raw water to flow from the tanks into a bottle only under a condition in which the measurement of any one of the aforementioned varying characteristics of the raw water exceeds a preselected, undesired value.

Through the use of a suitable number of the aforementioned, described instruments, it is possible to present concrete evidence in court of not only a chart record showing the exact time at which a certain measured condition of the stream indicated the raw water to be polluted, but also provides a specimen of the raw water at the exact time when the polluted condition of the stream occurred.

It is, therefore, a further object of the invention to disclose an apparatus for automatically drawing intermittent or continuous samples of raw water from selected depths and positions along a fluid stream so that public health authorities will have an actual specimen and an extremely accurate record of the exact instant of time when an identifiable harmful chemical was dumped into a stream which makes the raw water of the stream unfit for human consumption and for use by a water filtration plant and which, in certain cases, causes destruction of the fish, animal, and vegetable life therein which keep the stream in a healthy condition.

Of the drawing:

FIG. 1 is a perspective view of the pump and water analyzing apparatus;

FIG. 2 is a sectional view taken along line 2—2 of FIG. 1;

FIG. 3 is a partial sectional view taken along line 3—3 of FIG. 2;

FIG. 4 is a partial sectional view taken along the line 4—4 of FIG. 2;

FIG. 5 is a partial sectional view taken along the line 5—5 of FIG. 2;

FIG. 6 is a partial sectional view taken along the line 6—6 of FIG. 2;

FIG. 7 shows a single multi-scale chart that is used in the recorder shown in FIG. 1;

FIG. 8 is a schematic diagram of a control circuit that is associated with the measuring apparatus shown in FIG. 1;

Figure 9:
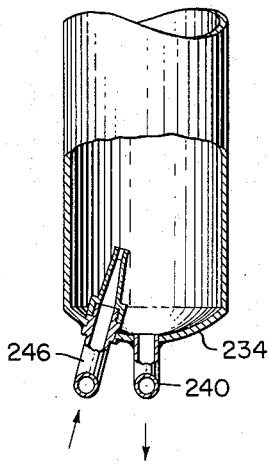
FIG. 9 shows another modified form of a tank that can be used for each of the six tanks shown in FIG. 2.

FIG. 1 of the drawing shows an adjustable float-mounted pump structure 10. This float-mounted pump structure 10 is comprised of a U-shaped float 12, which can be made of any one of a number of wood or plastic materials which float, such as balsa wood or styrofoam. Each of the L-shaped bearing support brackets 14, 16 that are shown in FIG. 1 are fixedly connected to the top portion of the float 12 by means of suitable connecting means, such as the screws 18, 20. Each of the support brackets 14, 16 are shown provided with top bearing block members 22, 24 which are fixedly connected thereto by suitable connecting means such as the tap bolts 26, 28.

A shaft 30 is shown extending between the upper, outer end surfaces of the support bracket-top bearing block members 14, 22; 16, 24. Fixedly mounted on this shaft 30 at a position that is between the inside surfaces of the support brackets and the top bearing block members 14, 22; 16, 24 there is shown a substantially U-shaped bracket 32. The right and/or left side wall portions of this bracket 32 are provided with a suitable number of spaced-apart apertures such as are shown at 34, 36. The side walls of the support brackets 14, 16 are each provided with apertures 38, 40 through which a suitable retaining pin, such as the pin 42 can pass. After the pin 42 is passed through, e.g., the aperture 38, and through a selected one of the apertures 34 or 36 in the substantially U-shaped bracket 32, it can be seen that this latter-mentioned bracket will be retained in a fixed position with respect to the support brackets 14, 16, and the float 12 on which these brackets are mounted.

It can further be seen that if a pump 44 is fixedly mounted as shown by a suitable connecting means such as welding material to the aforementioned U-shaped bracket 32, that the fluid inlet 46 of this pump can be adjusted to various depths in the fluid 48 by adjustably positioning the pin 42 into selected apertures 34, 36 formed in the bracket 32.

The pump 44 can also be removed from its float pivots and lowered to any depth in the stream by means of a winch, not shown, so that the characteristics of the water at that depth can be transmitted through the conduit 50 in the manner to be hereinafter described.

A single, corrosive-resistant, flexible conduit 50 is shown connected at one end 52 to a fluid outlet of the immersed pump 44 and at its other end to an upper leg of a T-fitting 54. The right end branch of the T-fitting 54 is threadedly engaged with the left end of a pipe section 56 which in turn is threadedly connected at its right end to the left branch of another T-fitting 58.

A manually-adjusted valve 60 is shown mounted for actuation between an adjustably-fixed, selected open position and a closed position in the upper vertical branch of the last-mentioned T-fitting 58. Fixedly connected to the right branch of the T-fitting 58 there is shown a conduit 62 through which selected portions of the fluid that is being pumped by the pump 46 through conduit 50 and the T-fitting can flow in the direction of the arrow 64 back into a stream location which is different than that from which the fluid is being drawn for measurement.

A conduit 66 is fixedly connected to the left branch of the T-fitting 54 for passing that portion of the fluid being pumped by pump 44 into the T-fitting 54 to a reducer 68 which is not returned by way of the pipe fitting parts 56, 58, 62 to the fluid stream 48.

As is best shown in FIG. 2, the inner wall of the left end of the reducer 68 is threadedly connected at 70 to the right, fluid inlet end 72 of the manifold 74. FIG. 2 also shows the fluid inlet end 72 of the manifold 74 passing through an aperture 76 formed by the right wall 78 of a rectangular-shaped container 80.

A fluid-tight joint is formed between the container wall 78 and the fluid inlet end 72 of the manifold 74 that passes therethrough when the lock nuts 82, 84 are threadedly adjusted along the inlet end 72 to the position shown. When the lock nuts 82, 84 are placed in this position, they will compress the rubber washers 86, 88 into fluid-tight engagement with the wall 78 of the container 80 and the outer surface of the inner end 72 of the manifold 74.

The manifold 74 extends into a base portion of the container 80 and has a plurality of inlet branch connections 90, 92, 94, 96, 98, 100. Each of these inlet branch connections 90–100 provides a passageway in an opening formed by the wall forming the base of the individual tanks 102, 104, 106, 108, 110 and 112 with which these inlets are associated such as is shown in FIG. 3 for the opening formed by the wall 114 in the base to the tank 102. A fluid-tight connection is made between each of the tank inlet branch connections 90–100 and the base of their associated tanks 102–112 in the manner shown for the branch connection 90 and the tank 102 shown in FIG. 3. This fluid-tight connection is comprised of two locking nuts 116, 118 and sealing washers 120, 122 which may be made of a rubber or other sealing material. The outer surface of the end portion of each of the inlet branch connections is provided with screw threads so that a probe-cleaning nozzle can be threadedly mounted thereon in the manner shown for the nozzle 124 in FIG. 3. In this manner, the initial spray of raw water or other fluid being pumped, e.g., from a fluid stream through the aforementioned nozzles, will be directed against their associated fluid-sensing probes 126, 128, 130, 132, 134 and the turbidity sensor 136 which probes and turbidity sensor are employed to measure respectively the conductivity, dissolved oxygen content, temperature, pH, chloride content, and the turbidity of the raw river water 48 under measurement. When testing samples for such things as dissolved oxygen content, it is desirable to employ a sand filter within the aforementioned nozzles. Such a sand filter 137 will remove mud and other foreign particles from the raw water before it enters the tanks in which, e.g., the conductivity and dissolved oxygen probes are located. An accurate measurement of conductivity and dissolved oxygen will be obtained when such a filter 137 is used since the measurements made by the probes 126, 128 are not effected by the mud and other foreign particles removed by the sand filter. Another sensor 135 is used to measure the intensity of the sunlight falling on the fluid stream, as is shown in FIG. 1.

From the description of the aforementioned tank 102 construction, it can be seen that the raw river water will continue to be sprayed against the aforementioned probes to clean them until the level of the inflowing raw water covers the tips of the aforementioned nozzles. Such a nozzle-tank arrangement thus provides an automatic way of periodically cleaning the probes 126–134 and turbidity sensor 136.

Each of the three pair of tanks 102, 104; 106, 108; and 110, 112 are fixedly connected by welding material to and supported on associated, inverted, T-shaped brackets 138, 140, 142. These brackets 138–142 are, in turn, fixedly connected by welding material to the base plate 144 and the side plates 146, 148 of the container 80.

The upper portion of each tank 102–112 is provided with any suitable number of associated overflow drains. For the purpose of illustration, these drains can take the form of, e.g., the apertured wall portions 150, 152; 154, 156; 158, 160; 162, 164; 166, 168; and 170, 172 formed in the sides of each of these tanks which precisely fix the level of the raw water in each filled tank.

Each of the aforementioned overflow drains 150–172 is shown at the same level so that upon simultaneously filling the tanks 102–112 to this overflow drain level, the raw water will flow through these drains 150–172 into the space formed by the outside surface of each of the tanks 102–112 and the inside surface of the container 80. If a more rapid draining of each tank 102–112 is desired, additional drains can be employed between and at the same level as the previously-mentioned drains 150–172.

The size of the last-mentioned space is a pre-selected, fixed, number of times greater than the combined fluid-carrying capacity of the tanks 102–112. It has been found that if the size of the aforementioned space is three times greater than that of the fluid-carrying capacity of the tanks 102–112, then a good representative sample of the raw water for measurement will be present in each tank after the three tankfuls of this raw water have been drained by way of overflow drains 150–172 into the container 80. While the aforementioned three tankfuls of raw water 48 flow through each tank 102–112 and overflow from these tanks into a single container 80 which surrounds these tanks, the inner and outer walls of the tanks will be cooled or heated to the same temperature as the water stream from which it is being pumped by pump 44.

Since the raw water 48 which is in the chamber 80 is maintained in contact with the outer wall of the tanks 102–112 while characteristic measurements of same are taken, the water in this chamber in effect will act as a temperature radiation shield. This arrangement thus insures a close temperature correlation between the temperature of the raw water under measurement in each tank and the temperature of the water in that part of the stream from which the fluid in the tank has been acquired.

The aforementioned correlation is important because experimentation has shown that an error of one degree centigrade in temperature results, e.g., in an error of approximately two percent in the dissolved oxygen measurement.

The container 80 is, in turn, provided with open overflow drain 174 through which rising raw water 48 in the space between the tanks 102–112 and the container 80 will flow when the level of the water has reached the preselected fixed maximum level 176, shown in FIGS. 3 and 4.

The flow of fluid passing through the overflow drain 174 can be located near a conventional sink, not shown, having an open drain therein to enable the fluid flowing through the drain 174 from the container 80 to be immediately removed from the area in which the raw water measurements are being taken.

The container 80 is also shown as having a drain 178 located as shown in FIG. 1 in a lower part of its right wall 78.

This drain 178 is provided with a solenoid-operated valve 180 which is normally held in a closed or in a fluid hold position. This solenoid valve 180 is actuated to an open position by an electrical switching circuit to be hereinafter described whenever it is desired to provide a timed, periodic, automatic cleaning of the container 80.

Each of the tanks 102–112 located within the container 80 is provided with an opening formed by its associated wall portion 182, 184, 186, 188, 190, 192 that forms the base of these tanks in the manner shown in detail in FIG. 3 for the opening formed by the wall portion 182 of the tank 102.

The branches 194, 196, 198 of a first drain header 200 pass through their associated openings formed by their walls 182, 186, 190 and are fixedly connected to these walls by a fluid-tight welding material as is best shown in FIG. 3.

The branches 202, 204, 206 of a second drain header 208 pass through their associated openings formed by the walls 184, 188, 192 and are fixedly connected to these walls by a fluid-tight welding material such as is best shown in FIG. 3.

The first and second drain headers 200, 208, shown in FIGS. 1 and 2 pass through apertures, not shown, which are in the right end plate 78 of the container 80 and a fluid-tight seal is formed therebetween at 210 and 212 in the same manner as the fluid-tight seal which was previously described in regard to the end 72 of inlet manifold 74.

A first T-fitting 214 has a fluid-tight connection with the right end of the first drain header 200 and also has a drain pipe 216 extending from its right end. A second T-fitting 218 is operably connected at one end to the right end of the second drain header 208 and also has a drain pipe 220 extending from the right end thereof.

A first solenoid valve 222 is schematically shown operably connected with the vertical branch of the T-fitting 214 which, when energized to an open position by an electrical circuit, to be hereinafter described, allows large or small quantities of raw water inside the tanks 102, 106, 110 under measurement to be drained therefrom by way of the first header 200, T-fitting 214 and drain pipe 216. Such draining can also be operated manually when the measuring station is manned, and it is desired to clean the water from the tanks or to obtain a sample from these tanks.

When this fluid measuring apparatus is installed at a measuring station that is unmanned, it may be desired to directly connect the water in these tanks 102, 106, 110 by way of drain pipe 216 to a plastic bottle 224 shown in FIG. 1 at the instant of time when one of the characteristics of the water being measured exceeds a preselected, undesired condition.

A second solenoid valve 226 is also shown operated simultaneously by the probes 126–134 or turbidity sensor 136 so that quantities of raw water from the tanks 104, 108, 112 can be allowed to flow through header 208, T-fitting 218 and drain pipe 220 to clean the last-mentioned tanks.

When the fluid measuring apparatus is installed at a measuring station that is unmanned it may be desired to employ a second sampling bottle 228 as shown in FIG. 1 so that it can be filled upon the opening of solenoid valve 226 with a composite sample of water from tanks 104, 108, 112 when another different characteristic of the water being measured by either another of the probes 126–134 or the turbidity sensor 136 exceeds a preselected, undesired condition.

The removable top plate 230 and the other parts forming the container 80, as well as the tanks 102–112 and their associated inlet manifold and drain headers 200, 208 are all made of a non-corrosive metal such as Monel.

Each of the tanks 102–112 has an upper end portion thereof fixedly connected to a wall portion in the top plate 230 which forms openings therein in the manner shown in FIG. 3 for the tank 102 and the apertured wall portion 232.

The bottom of each of the tanks 102–112 can take a different shape than that shown in FIG. 3. For instance, it may be preferred to make the bottom of these tanks of either a cupped, tapered or sloped-shape configuration such as are respectively disclosed in FIGS. 9, 10 and 11 of the drawing as the parts 234, 236, 238 so that their respective drain headers 240, 242, 244 will be located at the lowermost portion of each tank and thereby prevent any accumulation of solids in the bottom of these tanks.

Figure 10:
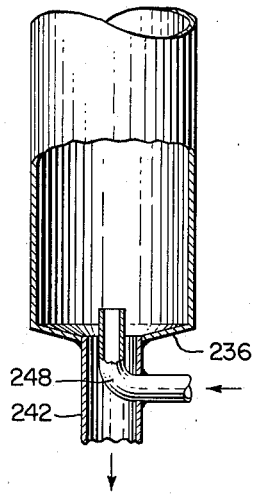
FIG. 10 shows still another modified form of a tank that can be used for each of the six tanks shown in FIG. 2
Figure 11:
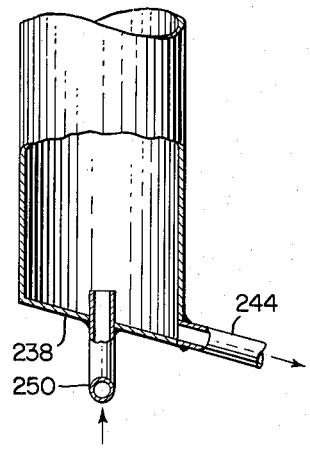
FIG. 11 shows still a third modified form of a tank that can be used for each of the six tanks shown in FIG. 2.

FIGS. 9, 10 and 11 also show different modified forms of fluid inlet branch conduits 246, 248, 250 which can be used with each of the tanks 102–112 shown in FIG. 2 when the shape of the base of these tanks is as shown in the respective FIGS. 9, 10, 11.

FIGS. 2 and 6 of the drawing show a corrosive-resistant sump tube 252 located between the tanks 108, 112 and the tank wall 146. FIG. 6 shows the end of this tube 252 fixedly connected by suitable welding material to the bottom of the container 80 and having a fluid inlet port 254 located a short distance from this connection. The top of the tube 252 is retained in a fixed position by a sleeve 256 that is fixedly connected to the removable cover plate 230 of the container 80. Removably mounted on the top of the tube 252 and protruding into the tube there is shown a switch support member 258 which has a spring-actuated, single-throw, double pole switch 260 mounted on its lower end.

The level of the fluid which enters this sump tank through the inlet port 254 will always be maintained at the same level as the fluid within the container 80 that is on the outside of this sump tank. Hence, when each of the tanks 102–112 has had three tankfuls of fluid passed therethrough, a spherical float 262 will at that time be moved into contact with the aforementioned, spring-actuated switch 260 shown in FIGS. 6 and 8 to actuate same. This spring-actuated switch has suitable electrical conductors 264, 266 for connecting this switch with the pump switching part of the electrical circuit shown in FIG. 8.

Each of the probes 126–134 and turbidity sensor 136 is shown provided with associated caps 268, 270, 272, 274, 276, 278 which, preferably, are made of a noncorrosive, nontoxic material such as Teflon.

Each of these caps 268–278 are shown in FIGS. 3 and 4 and 5 in removable, sliding, fluid-tight contact with the top and inner wall of the upper end of the associated tanks 102–112. These caps are shown supporting their associated probes 126–134 in the fluid to be measured and the lower end of the turbidity meter at a fixed distance from the top of the surface of the fluid in the tank 104.

The probes 126–134 which measure dissolved oxygen, temperature, pH, chloride ion, namely the probes 128–134, are of a commercially available type.

The conductivity probe 126 should be of a type which allows the raw water to flow freely between one or more pairs of electrodes in the tank 102 so that a good representative measurement of the fluid can be accomplished.

The cap 278 of the turbidity meter 136 is provided with a light source 280, a lens 282, a wall 284 forming a sharp light aperture, a transparent window 286 and one or more photoelectric cell units such as 288. These photocell units are arranged to measure the amount of light from the light source 280 that enters the fluid in the tank 104 which hits and is scattered by the particles present in the fluid and which is thereafter reflected back through the window 286 to the photocell units 288.

FIGS. 1 and 3 of the drawing show electrical conductors 290, 292 connecting the aforementioned photocell units 288 with a multi-point recorder 294 that is of the general type disclosed in the J. A. Caldwell Patent 2,423,480, issued July 8, 1947. Other pairs of electrical conductors 296, 298; 300, 302; 304, 306; 308, 310; 312, 314 and 315 are shown connecting each of the probes 126–135 with the multi-point recorder 294.

Heretofore, this recorder has employed a single multicolored print wheel 316 for sequentially recording a plurality of varying conditions such as the magnitude of a plurality of monitored temperature conditions on a single scale chart. In the measuring apparatus disclosed herein, a single chart 318 is provided which contains not just a single scale, but rather a plurality of differently calibrated, colored scales, namely, scales 320, 322, 324, 326, 328, 330 on which the six individual variable characteristics of the raw water being sensed by each of the probes 126–134 and the turbidity sensor 136, as shown in FIG. 7, can be recorded and read.

It should be noted that the same pattern of the six chart scales 320–330 as shown in FIG. 7 is continuously repeated in a serial fashion throughout the entire length of the chart.

The red recorded line 332 made by the print wheel 316, representing a turbidity measurement of the raw water, is read at any instant of recording time by projecting, e.g., the point 334 in an upper direction to the red-colored turbidity scale 322 or more conveniently in a downward direction to the red-colored turbidity scale, not shown, which is two scales below the brown-colored scale 330.

In a similar manner, it can be seen that an operator can visually project any recorded measurement in a forward or in a backward direction to the colored scale associated with this measurement, or the operator can use a straight edge, not shown, to assist him in this projection.

The purple recorded line 336, representing a temperature measurement of the raw water, is projected to its associated purple-colored temperature scale 320. The black recorded line 338, representing a pH measurement of the raw water, is also projected to its associated black-colored pH scale 324. The blue recorded line 340, representing the chloride ion content of the raw water, is projected to its associated blue-colored chloride ion content scale 326. The green recorded line 342, representing the conductivity of the raw water, is also projected to its associated green-colored conductivity scale 328. The brown recorded line 344, representing the dissolved oxygen content of raw water, is similarly projected to its associated brown-colored dissolved oxygen scale 330.

Another colored, recorded line, not shown, representing the intensity of the sunlight falling on the fluid stream as sensed by sensor 135, can also be similarly projected to an additional, associated, colored sunlight intensity scale, not shown.

If desired, this recorder 294 can be combined with an analog to digital converter, A to D unit 346, in a manner similar to that shown in the Kliever Patent 2,779,655, issued January 29, 1957. Since this recorder 294 is a synchronized type, the printing on the chart does not start until a re-balancing mechanism therein has been balanced against the input signals from one of the sensors 126–135 or from the turbidity sensor 136.

At this time, a transmitting slide wire is adjusted to a corresponding probe or turbidity sensor. Accordingly, at this time, if a control signal is sent to the analog to digital converter 346 to digitize the signal obtained from the retransmitting side wire, the digitized signal will be the representation of the input signal.

FIG. 8 of the drawing shows an electrical A.C. circuit 348 associated with the measuring apparatus previously described which has a neutral wire 350.

The component parts of this circuit 348 that are shown inclosed within the dot, long dash, dot lines 352 are all located within the casing 354 of the recorder 294 shown in FIG. 1. These component parts are comprised of a sampler timer 356, manually-adjusted reset button 358, a first relay 360, a second relay 362, a second sample timer 364 and multi-cam actuated mercury control switches, each of which are associated with a different one of the sensors 126–135 or turbidity sensor switching unit 366. This last-mentioned switching unit is of the general type that is shown in detail, e.g., in FIG. 3 of the Jordan Patent 2,451,439, issued October 12, 1948. This switching unit 366 consists of seven cams having differently-positioned, switch-actuating surfaces, such as 368, 370. During any one of the seven sensing measurements, selected ones of these sensing mercury switches, e.g. 372 of switching unit 366, will close when that measurement, being recorded on the chart, shown in FIG. 7, exceeds a preselected, undesired value.

Other component parts of the electric circuit 348 which are not located in the recording apparatus 354 which are shown in FIG. 8 are the pump 44, single-throw, double pole liquid level switch 260, solenoids 222 and 226, which have been previously described, and the master timer 374. This master timer 374 is arranged to close switch 376 shown in FIG. 8 whenever the time, which is manually selected by rotating the time-adjusting lever 378 located on the face of the timer shown in FIG. 1, has expired.

OPERATION ON AN INTERMITTENT SAMPLING BASIS

Normal operation

Lower contact on relay 360 is de-energized and closed to provide power to a master timer 374 and pump relay 362. When the desired time interval for pumping is reached by the timer 356, contact of the master timer 374 closes switch 376, thus energizing pump-energizing relay 362. The pump starts running and continues to run until the level switch 260 shown in FIGS. 6 and 8 is opened by the rising raw water in the container 80.

Another contact on the master timer 374 closes the normally open solenoid valve on the lower drain outlet 178 allowing the water to fill the container 80.

When the single-throw, double pole level switch 260 shown in FIG. 8 opens the pump contact it will simultaneously close the command to measure contact which energizes a conventional printing switch on the recorder 294 to make the record at the end of the time interval. The timer-actuated relay 362 drops out and the solenoid valve 180 on the lower drain 178 opens allowing the tank to drain in preparation for the next cycle. Under some conditions it is desirable to keep the container 80 full until just prior to the raw water pumping operation. Under these conditions, the drain valve 180 is a normally closed valve that is opened for a preset time by the master timer 374 prior to the pumping operation.

Out of limit operation

If the value of any one of the water conditions being sensed by the probes 126–135 and turbidity sensor 136 goes beyond a preset limit which would cause, e.g., the mercury switch 372 to trip and the alarm relay 360 to be energized and locked in by its own upper contact 380 such an action would pull in solenoid valve 222 and solenoid valve 226 which, in turn, would allow the sample bottles 224, 228 to be filled. Filling of the bottles would continue until sample timer 364 is timed out.

When relay 360 pulls in, power is removed from the master timer 374 and the pump circuit to prevent pumping new water until the sample bottles are filled.

The cycling action would normally be discontinued until the manually reset button 358 is pushed in. However, by employing the sample timer 356, which is of a non-reset type, this timer 356 can prevent re-cycling upon the occurrence of a second alarm, for example, a condition in which a condition of the raw water being measured goes beyond an undesired, preselected limit.

It is important for public health officials to have an accurate measurement of the intensity of the sunlight falling on the stream because it is the intensity of the sunlight along with the chlorophyll of the plant life of the stream that controls the speed at which carbon dioxide in the atmosphere can be converted into healthy plant tissue during the well-known process called photosynthesis.

The accurate conductivity and pH measurement which is afforded by the previously-described, completely automatic river water analyzing device will assist the public health officials in determining the kind of dissolved solids and the strength of the acid in the raw water under measurement. This information thus assists these officials in discovering what type of acid and how much of it has been illegally dumped into a stream.

Public health officials are also interested in accurate ways of measuring sediment and salinity of water being delivered by natural or man-made streams to irrigate farm land. The completely automatic stream water analyzing system previously described provides these officials with portable instrumentation which will give them a continuous, joint conductivity-turbidity measurement that will assist them in their studies of stream pollution problems. For example, public health officials can combine accurate measurements of turbidity, or muddy water, and conductivity measurements of a stream to determine if there is or is not a salt "run-off" from a farmer's land through which the stream is flowing.

Since this system also affords a continuous measurement of the temperature and dissolved oxygen content of the raw water it will inform public health officials of the parts per million of oxygen that is in the stream at any instant of time so that appropriate corrective action can be taken whenever a slight deficiency in the oxygen content of the stream occurs.

In this way the health of the animal, fish and vegetable life of the stream, which keeps the stream in a healthy condition, will be preserved.

Public health people who make use of the aforementioned completely automatic raw water measuring apparatus can through the use of this self-cleaning apparatus disclosed herein become aware of certain changing characteristics of a stream that are taking place, which if continued, would cause the stream to become polluted. The aforementioned extremely accurate measuring apparatus thus affords a sufficient amount of time for the public health officials to employ corrective techniques to recondition, will be preserved.

What is claimed is:

1. A fluid analyzing apparatus, comprising a container, a plurality of spaced apart sampling tanks retained within and in space relation to the side and bottom walls of the container, the capacity of the container being a preselected, fixed number of times greater than the total capacity of the tanks, a manifold positioned within a base portion of the container and having inlet branch connections thereof opening into associated inner bottom portions of the sampling tanks, means adapted to convey fluid to be analyzed into said manifold to effect a flow of the fluid through open overflow drains formed by an upper wall portion of each of the tanks and the container, means positioned in each of the tanks that are responsive to a different characteristic of the fluid under measurement, a multi-point recorder, and interlock switching means positioned between the outer side wall of the tanks and the inner surface of the wall of the container, said switching means being operably arranged to connect the responsive means with the multi-point recorder for recording the characteristics of the fluid in each tank when a preselected number of full tanks of the fluid under measurement have passed through the overflow drains of the tanks into the container.

2. The apparatus as defined in claim 1, wherein the recorder is provided with a chart having inscribed thereon a repeated series of differently colored and differently calibrated scales extending between the ends of the chart, a multicolored print wheel for consecutively printing different colored lines on the chart that are of the same color as those on the differently colored scales, said lines being recorded by said print wheel at positions across the scales on the chart in accordance with the magnitude of each different characteristic of the fluid being sensed by said responsive means in each tank.

3. A raw water-analyzing apparatus, comprising a container, a plurality of spaced apart sampling tanks retained within and in space relation to the side and bottom walls of the container, the capacity of the container being a preselected fixed number of times greater than the total capacity of the tanks, a manifold positioned within a base portion of the container and having separate individual inlet branch connections thereof opening into associated inner bottom portions of the sampling tanks, means adapted to convey raw water being pumped from a river to be analyzed into said manifold to effect a flow of the raw water through open overflow drains formed by an under measurement, a multi-point recorder, an interlock tainer, means positioned in each of the tanks that are responsive to a different characteristic of the raw water under measurement, a multi-point recordert, an interlock switching means positioned between the outer side wall of the containers and the inner wall of the container, said switching means being operably arranged to connect the responsive means with the multi-point recorder for recording the characteristics of the raw water in each tank when a preselected amount of the raw water under measurement has passed through the overflow drains of the tanks into the container.

4. The raw water analyzing apparatus as defined in claim 3, wherein a switching circuit is employed between said recorder and a solenoid-operated valve positioned in a drain conduit that has one end thereof connected to wall portions forming openings in the bottom portion of the tanks, the switching circuit being operably responsive to open the valve and allow a specimen of the raw water under measurement to pass through an open end of the drain conduit when the magnitude of the recorded value of any one of the characteristics of the raw water under measurement indicates the raw water to be in a polluted condition.

5. The raw water analyzing apparatus as defined in claim 3, wherein a switching circuit is employed between said recorder and a solenoid-operated valve positioned in a drain conduit that has one end thereof connected to wall portions forming openings in the bottom portion of selected ones of the tanks, a sampling bottle removably connected to an open end of the drain conduit, the switching circuit being operably responsive to open the valve and allow a specimen of the raw water under measurement to pass through an open end of the drain conduit when the magnitude of the recorded value of any one of the characteristics of the raw water under measurement indicates the raw water to be in a preselected, undesired condition.

6. The raw water analyzing apparatus as defined in claim 3, wherein a switching circuit is employed between said recorder and a solenoid-operated valve positioned in a drain conduit that has one end thereof connected to wall portions forming openings in the bottom portion of the tanks, the switching circuit being operably responsive to open the valve and allow a specimen of the raw water under measurement to pass through an open end of the conduit when the magnitude of the recorded value of any one of the characteristics of the raw water under measurement indicates the water to be in a polluted condition, and wherein the drain conduit has an outlet end portion thereof circumferentially spaced outwardly of the inlet branch connections.

7. An apparatus for facilitating the continuous measurement of the quality of a fluid stream, comprising a plurality of spaced-apart overflow tanks, a container surrounding the tanks, a manifold having an inlet port passing through a side wall of the container and outlet ports operably connected to and protruding into the inner bottom portions of the tanks, said inlet port being adapted to receive a stream of fluid to be measured, each of the tanks having a separate probe that is responsive to a different characteristic of the fluid under measurement and the end of each of the outlet ports of the manifold having a nozzle-shaped fitting thereon adapted to direct a jet stream of the fluid to be measured against its associated probe to continuously clean same until the nozzles are covered by the fluid under measurement flowing into the tanks.

8. An apparatus for facilitating the continuous measurement of the quality of a fluid stream, comprising a plurality of spaced-apart overflow tanks, a container surrounding the tanks, a manifold having an inlet port passing through a side wall of the container and outlet ports operably connected to and protruding into the inner bottom portions of the tanks, said inlet port being adapted to receive a stream of fluid to be measured, a separate probe in each tank, each of the probes having a sensing portion positioned in the path of the inflowing stream of fluid and being responsive to a different characteristic of the fluid under measurement, and the end of each of the outlet ports of the manifold having a sand filter nozzle fitting thereon to remove foreign particles from the inflowing stream of fluid that would otherwise interfere with the accurate sensing of different characteristics of the fluid that are being measured by the probes and to direct the initial inflowing stream of fluid toward the sensing probe.

9. A water analyzing apparatus, comprising a plurality of spaced-apart overflow tanks elongated in a vertical direction, a probe responsive to a different physical characteristic of the water to be analyzed positioned in each tank, an inlet conduit extending through the bottom of each tank, each inlet conduit being operably connected to a common manifold, a single transmission conduit connected at one end to the manifold and having a second end adapted to receive a flow of water to be analyzed that is at a selected depth in a flowing stream, a plurality of overflow passageways in an upper portion of each tank, a container having base and side wall portions positioned exterior to and in spaced relation with associated base and side wall portions of the tanks, the capacity of the container formed by the exterior wall of the tanks and the inner wall of the container being at least three times the total capacity of the tanks, an open overflow passageway in an upper wall of the container positioned at a level that is lower than the first-mentioned overflow passageway and adapted for passage of the flowing stream of water being analyzed therethrough after it has been received and passed through the inlet conduit, the first-mentioned overflow ports and into the container and the construction of the container, and tanks retained therein being adapted to allow the water being analyzed to pass through said tanks and container to thereby act as a temperature radiation shield to maintain the temperature of the water being measured by the probes in the tanks at substantially the same temperature as the water that is at the selected depth in the flowing stream.

10. The stream water analyzing apparatus defined by claim 9 wherein the manifold is positioned substantially midway between the bottom of the container and the bottom of the tanks.

11. A fluid analyzing apparatus, comprising a container, a tank positioned within and in space relation with a wall forming the bottom and side portions of the container, the capacity of the space defined by an outer wall of the tank and an inner wall of the container being several times greater than the capacity of the tank, fluid passageways adapted to pass a sample of fluid to be analyzed in series through a base portion of the container and tank into the tank, through and over the top side wall of the tank into the container and out through a drain in an upper wall portion of the container, and a responsive means associated with the tank adapted to measure changes occurring in the physical characteristics of the fluid under analysis.

12. The fluid analyzing apparatus as defined by claim 11 further comprising a float, a pump, and a mechanically adjusted means extending between the float and pump to lower the pump below the float to a selected depth from a selected surface location in a stream to thereby enable the pump to pump fluid from the selected depth and location through the passageways.

13. An apparatus for facilitating the continuous analysis of a quality of a fluid stream, comprising a tank, a container having an inner wall surface spaced from and surrounding the tank, a conduit having an inlet port passing through a side wall of the container and an outlet port operably connected to and protruding into the inner bottom portion of the tank, said inlet port being adapted to receive a stream of fluid to be analyzed, said tank having a probe retained therein that has a portion thereof responsive to the quality of the fluid under analysis and the end of the outlet port of the conduit having a nozzle-shaped fitting thereon adapted to direct a jet stream of the fluid under analysis against the portion of the probe that is responsive to the quality of the stream of fluid under analysis.

14. An apparatus for facilitating the continuous analysis of different qualities of a fluid stream, comprising a plurality of tanks, a container surrounding the tanks, a conduit having an inlet port passing through a side wall of the chamber, a separate partially restricted outlet port operably connected to the conduit and protruding into the inner bottom portion of each tank, said inlet port being adapted to receive a stream of fluid to be analyzed, a separate probe positioned within each of the tanks, each probe having a sensing portion that is responsive to a different characteristic quality of the fluid under analysis and the end of each of the outlet ports being positioned to impinge a jet of the fluid to be analyzed against the sensing portion of each probe.

15. An apparatus for facilitating the continuous analysis of the dissolved oxygen content of a fluid stream, comprising a tank, a container having inner wall surfaces spaced from and surrounding the tank, a conduit having an inlet port passing through a side wall of the container and an outlet port operably connected to and protruding into the inner bottom portion of the tank, said inlet port being adapted to receive a stream of fluid whose dissolved oxygen content is to be analyzed, said tank having a dissolved oxygen content analyzing probe retained therein that has a portion thereof which is responsive to the dissolved oxygen content of the fluid under analysis, and the end of the outlet port of the conduit having a nozzle-shapped fitting thereon adapted to impinge a jet of the fluid under analysis against the portion of the probe that is responsive to the dissolved oxygen content of the stream of fluid.

References Cited by the Examiner
UNITED STATES PATENTS

| | | | |
|---|---|---|---|
| 1,462,952 | 7/23 | Whaler et al. | 346—134 X |
| 2,082,299 | 6/37 | Nonhebel et al. | 73—53 |
| 2,125,345 | 8/38 | Hunt | 346—46 |
| 2,238,677 | 4/41 | Collins et al. | |
| 2,934,959 | 5/60 | Johnson | 73—422 |

RICHARD C. QUEISSER, *Primary Examiner.*

DAVID SCHONBERG, *Examiner.*